US007999649B2

(12) United States Patent
Kojima

(10) Patent No.: US 7,999,649 B2
(45) Date of Patent: Aug. 16, 2011

(54) POWER TRANSMISSION TRANSFORMER FOR NONCONTACT POWER TRANSFER DEVICE

(75) Inventor: Hideki Kojima, Kawagoe (JP)

(73) Assignee: Toko, Inc., Ota-Ku, Tokyo-To (JP)

( * ) Notice: Subject to any disclaimer, the term of this patent is extended or adjusted under 35 U.S.C. 154(b) by 0 days.

(21) Appl. No.: 12/804,882

(22) Filed: Aug. 2, 2010

(65) Prior Publication Data

US 2010/0295651 A1 Nov. 25, 2010

Related U.S. Application Data

(62) Division of application No. 12/082,275, filed on Apr. 10, 2008, now abandoned.

(30) Foreign Application Priority Data

Apr. 13, 2007 (JP) .................................. 2007-105526

(51) Int. Cl.
*H01F 27/30* (2006.01)
*H01F 38/30* (2006.01)
*H01F 27/28* (2006.01)

(52) U.S. Cl. ...... 336/185; 336/84 M; 336/145; 336/182; 336/198; 336/208; 336/220; 336/222

(58) Field of Classification Search ........................ None
See application file for complete search history.

(56) References Cited

U.S. PATENT DOCUMENTS

| 5,010,314 A * | 4/1991 | Estrov ........................ 336/198 |
| 5,319,342 A * | 6/1994 | Kuroki ........................ 336/170 |
| 6,630,880 B2 * | 10/2003 | Cheung et al. ................ 336/198 |
| 7,219,416 B2 * | 5/2007 | Inoue et al. .................... 29/606 |
| 2005/0275497 A1 * | 12/2005 | Ramadan et al. ............ 336/200 |

* cited by examiner

*Primary Examiner* — Anh T Mai
*Assistant Examiner* — Mangtin Lian
(74) *Attorney, Agent, or Firm* — Renner, Kenner, Greive, Bobak, Taylor & Weber

(57) ABSTRACT

The present invention provides a power transmission transformer of which workability in implementing and reliability of connection are considered in a noncontact power transfer device using individual self-oscillation circuits. The power transmission transformer for a noncontact power transfer device including a transmitting coil L1 and a drive coil L2 for self-oscillation on a power transmission device side includes a bobbin in which the transmitting coil and the drive coil L2 are disposed, in which the transmitting coil and the drive coil L2 are configured by an air-core coil using self-bonding wire, and the bobbin 1 includes a winder spindle 1a, 1b on both surfaces opposed to each other across a collar 2 formed of a flat plate, and a mating portion 3 for mating with an external portion in an end portion of the winder spindle 1b, and the drive coil L2 is mounted on the winder spindle 1b and the transmitting coil L1 is mounted on the other, opposed winder spindle 1a across the collar.

8 Claims, 4 Drawing Sheets

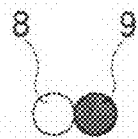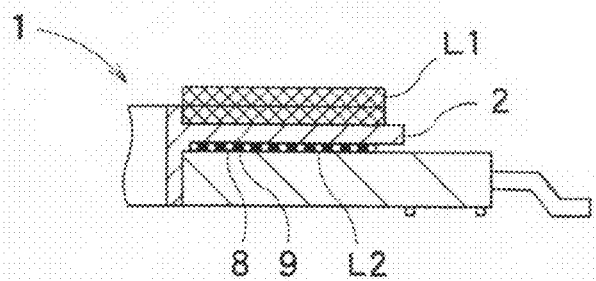
FIG.5A   FIG.5B
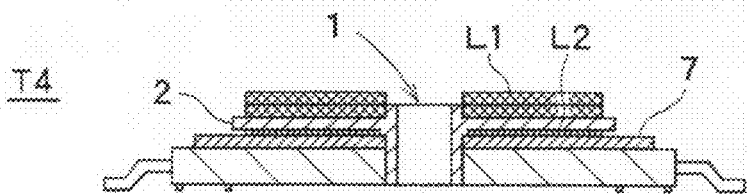
FIG.6
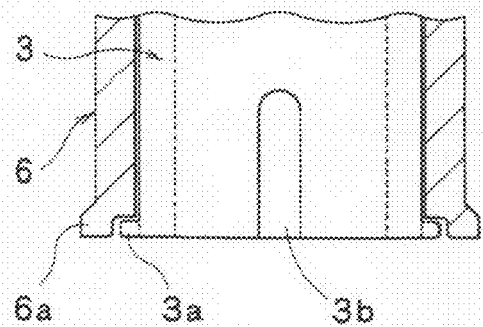
FIG.7A
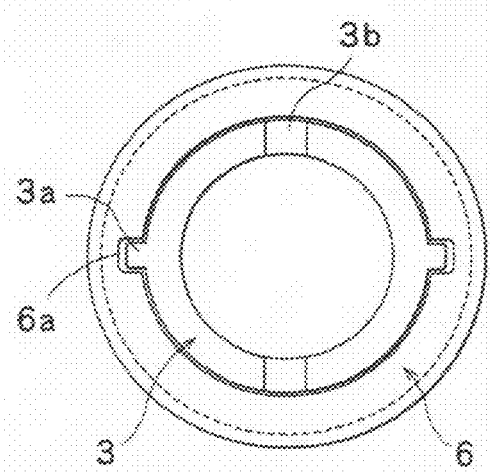
FIG.7B

POWER TRANSMISSION TRANSFORMER FOR NONCONTACT POWER TRANSFER DEVICE

CROSS-REFERENCE TO RELATED APPLICATION

This application is a division of U.S. patent application Ser. No. 12/082,275 filed Apr. 10, 2008 now abandoned.

BACKGROUND OF THE INVENTION

1. Field of the Invention

The present invention relates to a power transmission transformer for a noncontact power transfer device, and especially to a power transmission transformer for transferring electric power to a rechargeable battery used as a power supply for a cordless phone, a portable device and the like, the electric power being transferred in a noncontact state without through a metal contact from a power transmission device to a power receiving device by electromagnetic induction.

2. Related Art

FIG. 8 shows a noncontact power transfer device using a self-oscillation circuit in a power transmission portion as a circuit scheme which has a simplified configuration and low power consumption.

In FIG. 8, a power transmission side 10 which is a power transmission device includes a power transmission transformer T composed of a transmitting coil L1 and a drive coil L2 for self-oscillation, and a switching element Q1 in a power transmission portion. A power receiving side 20 which is a portable device includes a receiving coil L3 and a rectifying and smoothing circuit, and further a charge control circuit and a rechargeable battery not shown. Then, a winding surface of the transmitting coil L1 and a winding surface of the receiving coil L3 are placed to be opposed to each other in separable housings, and electrical power is transferred.

FIG. 9 shows an arrangement in which the power transmission transformer T including the transmitting coil L1 and the drive coil L2 in the power transmission portion of the power transmission side 10, and the receiving coil L3 of the power receiving side 20 are disposed in such a configuration.

Japanese Patent Laid-Open No. 2002-17046 describes a method for transferring electric power to be here described. The transmitting coil L1 is formed of an air-core coil using self-bonding wire. The drive coil L2 is a printed coil formed similarly to a circuit pattern on the surface of the same as a substrate P1 for a peripheral circuit, and a winding surface of the printed coil and a winding surface of the air-core coil which is the transmitting coil are fixed to each other with an adhesive agent or the like across the substrate.

Further, the receiving coil L3 is formed of an air-core coil composed of the same self-bonding wire as that of the transmitting coil, and the air-core coil is attached on a substrate P2, and has a winding surface thereof placed on the bottom surface side of a housing. A winding surface of the receiving coil L3 and a winding surface of the transmitting coil L1 are placed to be opposed to each other across their own housings, and electric power is transferred from the device 10 which is the power transmission side to the device 20 which is the power receiving side.

According to this method, there is a problem that, when an input direct current (DC) voltage is specified to be low, the drive coil L2 formed of the printed coil has a larger loss.

Further, when the drive coil L2 is used in a resonance circuit of a ringing choke converter (RCC) which is another self-oscillation circuit, a drive voltage equal to or larger than a gate threshold voltage of a MOSFET is necessary because the drive coil L2 uses the MOSFET as a switching element, and accordingly a winding number has to be increased to form by using the printed coil, and the printed coil itself then becomes large, so that practical application has been difficult.

Further, if the drive coil L2 is used in a collector resonance circuit, and the transmitting coil L1 is placed on the surface opposed to the printed coil L2 across the circuit substrate, then coupling between the transmitting coil L1 and the drive coil L2 lowers by the amount corresponding to a thickness of the substrate. Thus, it is necessary to increase a winding number for that, and the winding number has to be increased to form by using the printed coil, and the printed coil itself becomes large, so that practical application has been difficult.

SUMMARY OF THE INVENTION

A method, to solve these problems, may be also conceived in that an air-core coil as the drive coil is attached on the surface opposed to the air-core coil of the transmitting coil across the substrate.

However, the method is not practical because of poor workability in connecting ends of winding wire, and the like, and low reliability of connection.

The present invention has been made under the above situations, and an object thereof is to provide a power transmission transformer of which workability in implementing and reliability of connection are considered in a noncontact power transfer device using individual self-oscillation circuits.

The present invention provides a power transmission transformer for a noncontact power transfer device including a transmitting coil and a drive coil for self-oscillation on a power transmission device side, the power transmission transformer including a bobbin in which the transmitting coil and the drive coil are provided in a prescribed location, in which the transmitting coil and the drive coil are configured by an air-core coil using self-bonding wire, and the bobbin includes a winder spindle on both surfaces opposed to each other across a collar formed of a flat plate, and a mating portion for mating with an external portion in one end portion of the winder spindle, and the drive coil is mounted by insertion on the winder spindle on the mating portion side and the transmitting coil is mounted by insertion on the other, opposed winder spindle across the collar.

Further, the bobbin has: a first bobbin including a winder spindle on both surfaces opposed to each other across a collar composed of a flat plate, and a mating portion in one end portion of the winder spindle; and a second bobbin including a plurality of external terminals and a mating hole in the central portion, in which the drive coil is mounted on the winder spindle of the first bobbin on the mating portion side and the transmitting coil is mounted on the other, opposed winder spindle across the collar, and the first bobbin and the second bobbin are fitted together.

Furthermore, the bobbin has: a first bobbin including a winder spindle on both surfaces opposed to each other across a plate-like collar, and a mating portion in one end portion of the winder spindle; and a second bobbin including a plurality of external terminals and a mating hole in the central portion, in which the first bobbin and the second bobbin are fitted together, and the drive coil is wound by a predetermined winding number around the winder spindle on the mating portion side, and an air-core coil using self-bonding wire which is the transmitting coil is mounted on the other winder spindle across the collar.

Because the power transmission transformer for a noncontact power transfer device is configured by using the bobbin, coupling between the transmitting coil and the drive coil can be enhanced by setting a collar thickness of the bobbin to a predetermined thickness, and the winding number of the drive coil can be reduced.

Further, when the winding number of the drive coil is specified, then the first bobbin and the second bobbin are fitted together, and the drive coil is wound on the collar of the first bobbin, and the second bobbin by a comparatively large winding number, and thereby a coil can be formed.

Further, the mating portion of the first bobbin may be directly mounted on the circuit substrate, and fitting the first bobbin and the second bobbin together may facilitate implementation on the circuit substrate.

As described above, the power transmission transformer for a noncontact power transfer device of the present invention can be improved in workability in implementing and reliability of connection by using the first bobbin and the second bobbin.

BRIEF DESCRIPTION OF THE DRAWINGS

FIGS. 5A and 5B are partial, longitudinal cross-sectional views showing a winding configuration of a drive coil used for an embodiment of the present invention;

FIG. 6 is a longitudinal cross-sectional view of a fourth embodiment of the present invention;

FIGS. 7A and 7B are illustrations showing a mating configuration of the first bobbin and the second bobbin used for an embodiment of the present invention;

DETAILED DESCRIPTION OF THE INVENTION

Figure 1A:
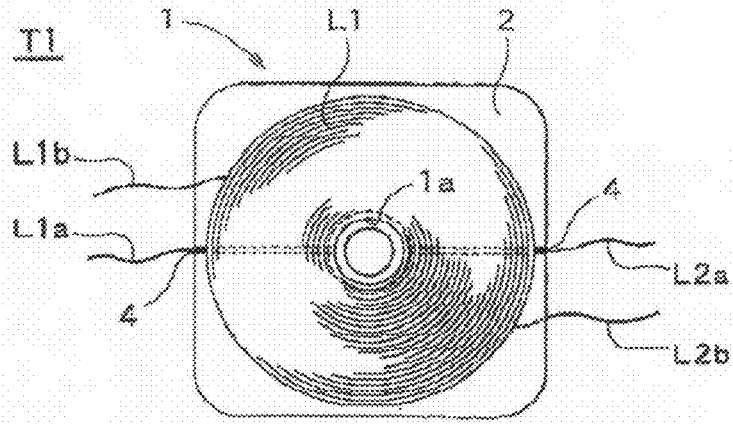
FIG. 1A is a plan view of a first embodiment of the present invention.

Referring to FIGS. 1 to 7, embodiments of the present invention will be described in detail.

First Embodiment

Referring to FIG. 1 illustrating a representative example of a power transmission transformer for a noncontact power transfer device according to the present invention, the power transmission transformer includes a transmitting coil L1, a drive coil L2, a first bobbin 1, and a collar 2.

As shown in FIG. 1, the first bobbin 1 is formed of synthetic resin having thermal resistance and insulating properties, and includes: a collar 2 which is approximately quadrangular and includes a cylindrical tubular portion having a predetermined thickness provided thereto; and a winder spindle 1a and a winder spindle 1b on both surfaces of the collar 2 opposed to each other; and further a mating portion 3 for fixing, extending to an end portion of the winder spindle 1b (on the bottom surface side). Then, a plurality of slits 4 made from an edge of the collar 2 to near the winder spindle is provided.

Figure 2A:
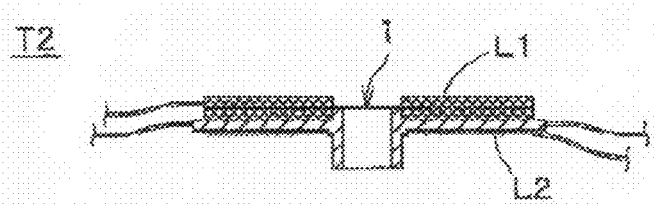
FIGS. 2A and 2B are longitudinal cross-sectional views of a second embodiment of the present invention.
Figure 2B:
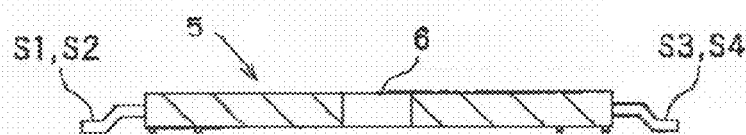
Figure 2C:
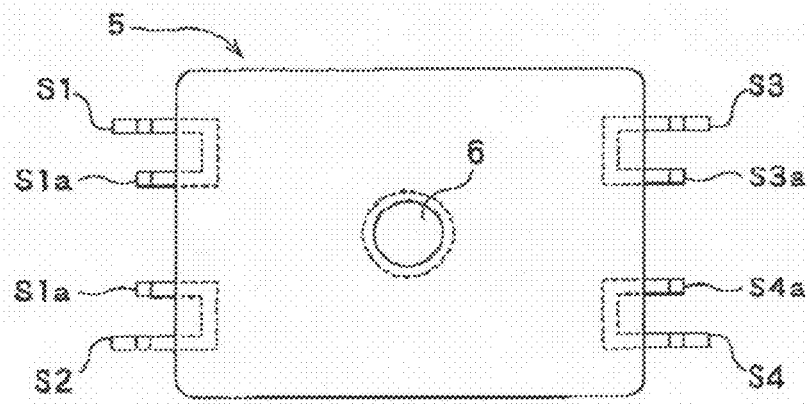
FIG. 2C is a plan view of the second embodiment of the present invention.

The second bobbin 5 is formed of flat and approximately quadrangular, synthetic resin having thermal resistance and insulating properties, and includes: a mating hole 6 for mating with the mating portion of the first bobbin 1; a plurality of electrically conductive, external terminals S1 to S4 for connecting to an external circuit; and further winding terminals S1a to S4a which are integrally connected to the external terminals internally (see FIG. 2C).

Air-core coils of the transmitting coil L1 and the drive coil L2 are wound, for example, using so-called "self-bonding wire" formed by coating the outside of polyurethane-coated steel wire with thermoplastic, bonding vanish or the like, and have a thin, tube-like shape having a hole in the central portion corresponding to the winder spindle. The transmitting coil has a large winding number, and the drive coil generally has a small winding number to the extent of one turn.

As a first embodiment, a power transmission transformer T1 which can be directly mounted on the surface of an external substrate will be described with reference to FIG. 1.

Figure 1B:
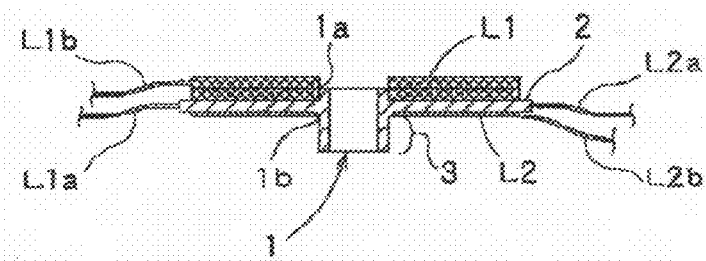
FIG. 1B is a longitudinal cross-sectional view of the first embodiment of the present invention.

In FIG. 1, FIG. 1A is a plan view, and FIG. 1B is an elevation view. As shown in FIGS. 1A and 1B, the power transmission transformer T1 is configured in a manner that the transmitting coil L1 is mounted on the collar 2 of the first bobbin 1 and the winder spindle 1a above across the collar 2, and the upper surface of the collar 2 and a winding surface of the transmitting coil L1 are fixed to each other with an adhesive agent or the like. At this time, a lead L1a at the winding start of the transmitting coil L1 is disposed along the slit 4 provided in the collar 2 so as to be drawn outside.

On the one hand, the drive coil L2 is mounted on the winder spindle 1b below the collar 2 in the first bobbin 1, and the lower surface of the collar 2 and a winding surface of the drive coil L2 are fixed to each other with an adhesive agent or the like. At this time, a lead L2a at the winding start of the drive coil L2 is disposed along the slit 4 provided in the collar 2 so as to be drawn outside.

Here, in connection to the external circuit, when a mating hole corresponding to the mating portion of the bobbin is provided on the surface of the external substrate (not shown), the first bobbin is directly fitted in the mating hole to be fixed, and the lead L1a at the winding start and a lead L1b at the winding end of the transmitting coil L1, and the lead L2a at the winding start and a lead L2b at the winding end of the drive coil L2 are electrically connected to a predetermined circuit pattern on the surface of the substrate, respectively, by soldering or the like.

Second Embodiment

As a second embodiment, a power transmission transformer will be described when a mating hole or the like cannot be provided in the surface of the external substrate.

FIG. 2 shows the assembling of a power transmission transformer T2. In FIG. 2, FIG. 2A is an elevation view of the power transmission transformer T2, and FIG. 2B is an elevation view of a second bobbin, and FIG. 2C is a plan view of the second bobbin.

As shown in FIG. 2, the power transmission transformer T2 includes a second bobbin 5 having a plurality of external terminals in addition to the power transmission transformer T1 of the first embodiment.

In the second embodiment, the mating portion 3 provided in the first bobbin of the power transmission transformer T1 in the first embodiment is fitted in the mating hole 6 provided in the second bobbin to be fixed. In addition, when bad fit or the like may be feared at the time of fitting, it may be desirable to fix together with an adhesive agent or the like.

Then, the lead L1a at the winding start and the lead L1b at the winding end of the transmitting coil L1, and the lead L2a at the winding start and the lead L2b at the winding end of the drive coil L2 are wound around the winding terminals of the second bobbin, respectively.

Figure 3A:
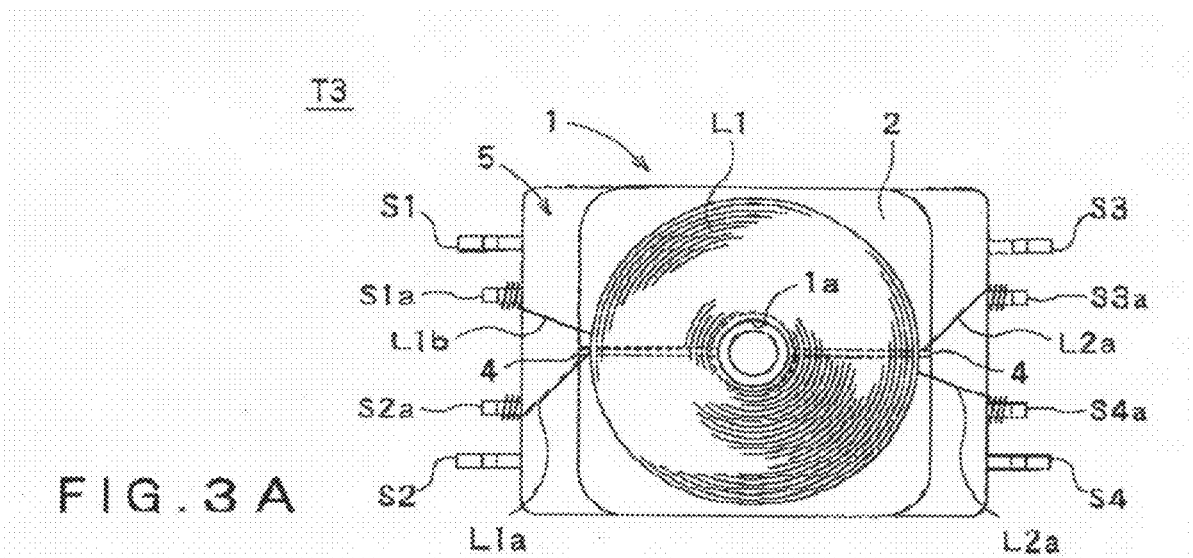
FIG. 3A is a plan view of a third embodiment of the present invention.

For example, the lead L2a at the winding start of the drive coil L2 is wound around the winding terminal S3a, and the lead L2b at the winding end is wound around the winding terminal S4a, and the lead L1a at the winding start of the transmitting coil L1 is wound around the winding terminal S2a, and the lead L1b at the winding end is wound around the winding terminal S1a (see FIG. 3A). Then, all the terminals are dipped in a static solder bath to be electrically connected.

As described above, the power transmission transformer T2 of the second embodiment, using the second bobbin 5, can be electrically connected to the external substrate with the external terminals S1 to S4 provided in the second bobbin 5. Further, when the external terminals are terminals compatible with surface mounting as shown in FIG. 2, the power transmission transformer T2 can be electrically connected by reflow soldering or the like at the same time similarly to other surface-mounted electronic components.

Third Embodiment

As a third embodiment, a power transmission transformer T3 will be described that is most suitable when the drive coil L2 has a comparatively large winding number, and the coil has a degree of freedom of winding.

Figure 3B:
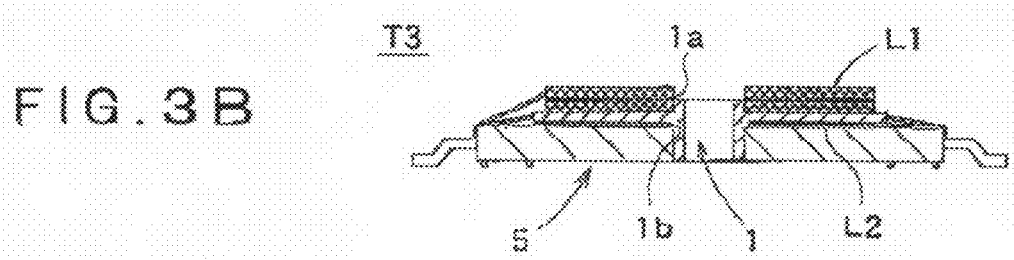
FIG. 3B is a longitudinal cross-sectional view of the third embodiment of the present invention.

In FIG. 3, FIG. 3A is a plan view of the power transmission transformer T3 and FIG. 3B is an elevation view thereof.

Figure 4A:
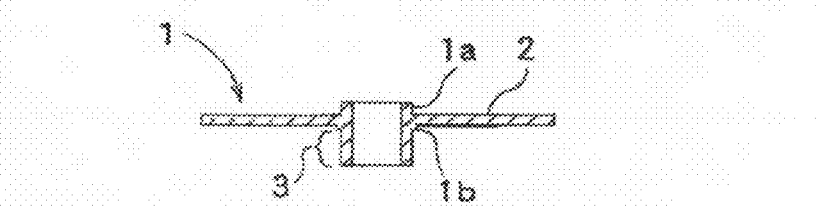
FIGS. 4A to 4C are illustrations showing a combined configuration of a first bobbin and a second bobbin used for an embodiment of the present invention.
Figure 4B:
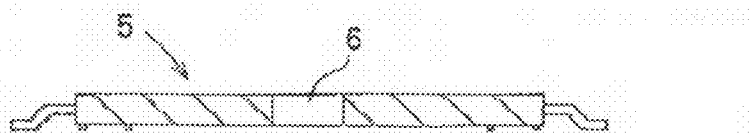
Figure 4C:
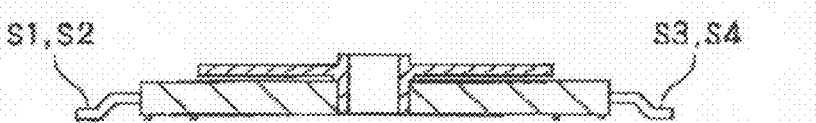
Figure 8:
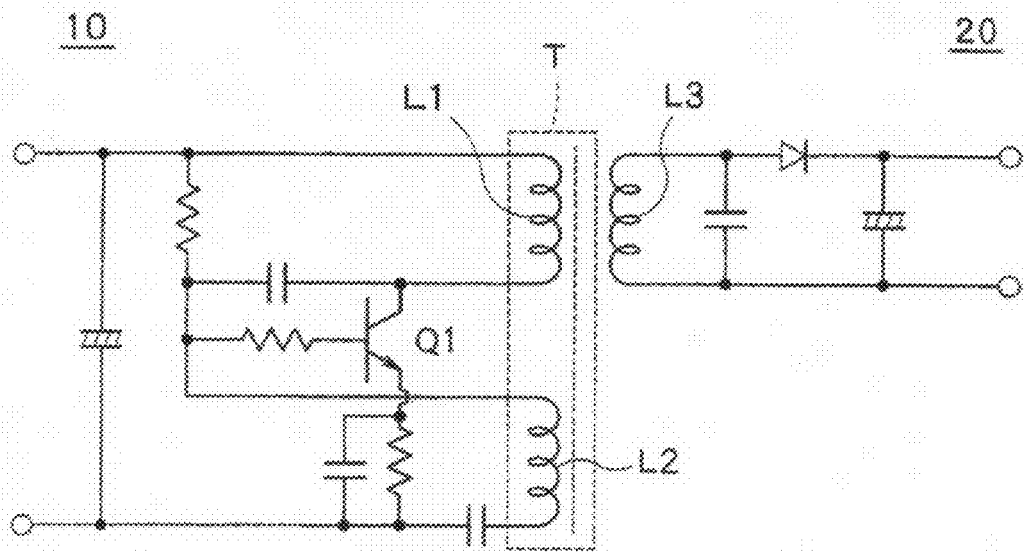
FIG. 8 is a circuit diagram of a general noncontact power transfer device using a self-oscillation circuit.
Figure 9:
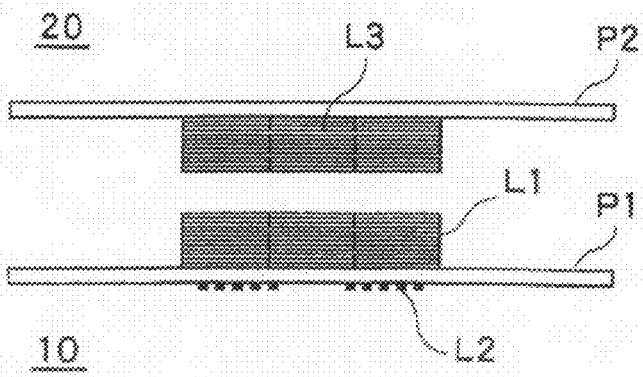
FIG. 9 is an illustration showing an arrangement in which a power transmission transformer and receiving coil are disposed.

FIG. 4 shows the assembling of the first bobbin and the second bobbin. FIG. 4A shows the first bobbin, and FIG. 4B shows the second bobbin, and FIG. 4C shows that the first bobbin and the second bobbin are fitted together.

As shown in FIG. 4, the power transmission transformer T3 is shown in FIG. 4C illustrating that the mating portions of the first bobbin (FIG. 4A) and the second bobbin (FIG. 4B) described in the first and second embodiments are beforehand fitted together.

In the power transmission transformer T3, as shown in FIG. 3, first, the drive coil L2 is formed by winding urethane-coated electrical conductor around the winder spindle 1b of the bobbin 1 by a predetermined winding number. At this time, the lead L2a at the winding start of the drive coil L2 is disposed along the slit 4 provided in the collar 2 so as to be drawn outside. The lead L2b at the winding end upon termination of the winding is wound around the winding terminal S4a, and subsequently the lead L2a at the winding start is wound around another winding terminal S3a.

Then, as the transmitting coil L1, an air-core coil using self-bonding wire is used, and mounted on the winder spindle 1a of the first bobbin 1, and the surface of the collar 2 and a winding surface of the air-core coil are bonded together to be fixed.

At this time, the lead L1a at the winding start of the transmitting coil L1 is drawn from the slit 4 provided in the collar 2 and wound around the winding terminal S2a, and also the lead L1b at the winding end is wound around the winding terminal S1a. Then, all the terminals are dipped in a static solder bath to be electrically connected.

Further, in order that the drive coil is formed in a space-wound manner, the drive coil L2 is wound by a predetermined winding number, and then as shown in FIG. 5A, insulated wire 9 using resin and insulating coating electrical conductor 8 are paired and then as shown in FIG. 5B, the pair of the insulated wire 9 and the insulating coating electrical conductor 8 are wound by level-winding. According to such configuration, coupling of the drive coil with the transmitting coil can be more enhanced than that of close winding.

In addition, also in the air-core coil of the drive coil in the first to third embodiments, an air-core coil may be used in which the insulated wire and the insulating coating electrical conductor are paired, and wound in a spiral form, and then caked with thermoplastic bonding vanish or the like.

Next, FIG. 6 shows a power transmission transformer T4 of another embodiment. The embodiment is configured to suppress a loss due to eddy current caused by the fact that unnecessary radiation from the transmitting coil L1 or the circuit pattern of the external substrate is perpendicular to a magnetic field component.

As shown in FIG. 6, the power transmission transformer T4 is configured by further providing a magnetic sheet 7 of approximately equal to or larger than an outer size of the collar on the winding surface of the drive coil L2 on the bottom surface side in the power transmission transformers T1, T2 and T3 described in the first to third embodiments.

Materials of the magnetic sheet 7 are magnetic powder and rubber material (insulating material), and a combination of the materials used may include: Fe—Si—Al alloy (flattened) and polyethylene thermoplastic elastomer (the product "BUSTERAID" from NEC TOKIN Corporation); Mn/Zn ferrite and EPDM (the product "Flexield (IV-M)" from TDK Corporation); and the like. Further, instead of these products, another radio wave absorber having a like, radio wave absorption effect may be used.

Such configuration allows the circuit pattern to be also provided on the surface of the external substrate on which the power transmission transformer is mounted, the size to be made smaller and unnecessary radiation to be suppressed.

FIG. 7 shows a configuration to firmly fit the bobbin 1 and the bobbin 2 together, and FIG. 7A is a longitudinal cross-sectional view, and FIG. 7B is a plan view. The mating portion 3 of the first bobbin includes a slit 3b and a projection 3a on an end portion of the opposed surface, and the mating hole 6 of the second bobbin has a depression 6a corresponding to the projection 3a of the mating hole of the first bobbin, and thereby the second bobbin is controlled not to rotate from the first bobbin, and easily combined with the first bobbin by using the slit 3b. This configuration can be applied to another embodiment. Moreover, a groove or a projection may be provided to prevent displacement, dropping off, and the like.

As described above, because the power transmission transformer for a noncontact power transfer device of the present invention is configured by using the bobbin, the coupling between the transmitting coil and the drive coil can be enhanced by setting a thickness of the collar of the bobbin to a predetermined thickness, and the winding number of each coil can be reduced, and further the coupling can be enhanced by winding the drive coil in an optional manner.

Furthermore, the mating portion of the first bobbin may be directly mounted on the circuit substrate, and fitting the first bobbin and the second bobbin together may facilitate implementation on the circuit substrate. Moreover, the magnetic sheet may be placed between the drive coil and the circuit substrate, which can suppress an oscillation noise, and prevent the eddy current loss associated with the circuit pattern.

As mentioned above, the power transmission transformer for a noncontact power transfer device of the present invention can be improved in workability in implementing and reliability of connection by using the first bobbin and the second bobbin.

What is claimed is:

1. A power transmission transformer for a noncontact power transfer device including a transmitting coil and a drive coil for self-oscillation on a power transmission device side,
    the power transmission transformer comprising a bobbin in which the transmitting coil and the drive coil are provided in a prescribed location, wherein
    the transmitting coil and the drive coil are configured by an air-core coil using self-bonding wire,
    the bobbin has: a first bobbin including a winder spindle on both surfaces opposed to each other across a collar composed of a flat plate, and a mating portion in one end portion of the winder spindle; and a second bobbin including a plurality of external terminals and a mating hole in the central portion,
    the drive coil is mounted on the winder spindle of the first bobbin on the mating portion side, and the transmitting coil is mounted on the other, opposed winder spindle across the collar, and
    the first bobbin and the second bobbin are fitted together.

2. The power transmission transformer for a noncontact power transfer device according to claim 1, wherein
    the drive coil is formed by pairing insulated wire using resin and insulating coating electrical conductor, and winding the pair by level-winding.

3. The power transmission transformer for a noncontact power transfer device according to claim 1, wherein
    a plurality of slits made from an edge of the collar to near the winder spindle is provided in the bobbin and a first collar, and
    leads at the winding start of the transmitting coil and at the winding start of the drive coil are disposed along the slits so as to be drawn outside.

4. The power transmission transformer for a noncontact power transfer device according to claim 1, wherein
    a magnetic sheet is provided between the drive coil, and the mating portion or the second bobbin.

5. A power transmission transformer for a noncontact power transfer device including a transmitting coil and a drive coil for self-oscillation on a power transmission device side,
    the power transmission transformer comprising a bobbin in which the transmitting coil and the drive coil are provided in a prescribed location, wherein
    the bobbin has: a first bobbin including a winder spindle on both surfaces opposed to each other across a collar composed of a flat plate, and a mating portion in one end portion of the winder spindle; and a second bobbin including a plurality of external terminals and a mating hole in the central portion, and
    the first bobbin and the second bobbin are fitted together, and the drive coil is wound by a predetermined winding number around the winder spindle on the mating portion side, and an air-core coil using self-bonding wire which is the transmitting coil is mounted on the other winder spindle across the collar.

6. The power transmission transformer for a noncontact power transfer device according to claim 5, wherein
    the drive coil is formed by pairing insulated wire using resin and insulating coating electrical conductor, and winding the pair by level-winding.

7. The power transmission transformer for a noncontact power transfer device according to claim 5, wherein
    a plurality of slits made from an edge of the collar to near the winder spindle is provided in the bobbin and a first collar, and
    leads at the winding start of the transmitting coil and at the winding start of the drive coil are disposed along the slits so as to be drawn outside.

8. The power transmission transformer for a noncontact power transfer device according to claim 5, wherein
    a magnetic sheet is provided between the drive coil, and the mating portion or the second bobbin.

* * * * *